(12) United States Patent
Hodge et al.

(10) Patent No.: US 7,294,425 B2
(45) Date of Patent: Nov. 13, 2007

(54) CHANNEL-LESS PROTON EXCHANGE MEMBRANE FUEL CELL

(75) Inventors: Rex A. Hodge, Sacramento, CA (US); Lyn M. Cowgill, Napa, CA (US); Tamer S. Douara, Sacramento, CA (US); Melissa F. Miller, Sacramento, CA (US); Wyatt B. Orsbon, Sacramento, CA (US)

(73) Assignee: SemGreen, L.P., Houston, TX (US)

( * ) Notice: Subject to any disclaimer, the term of this patent is extended or adjusted under 35 U.S.C. 154(b) by 489 days.

(21) Appl. No.: 10/742,709

(22) Filed: Dec. 19, 2003

(65) Prior Publication Data

US 2004/0131916 A1    Jul. 8, 2004

Related U.S. Application Data

(60) Provisional application No. 60/436,107, filed on Dec. 23, 2002.

(51) Int. Cl.
*H01M 2/00* (2006.01)
*H01M 2/02* (2006.01)
*H01M 2/14* (2006.01)

(52) U.S. Cl. .......................................... 429/34; 429/39
(58) Field of Classification Search ...................... None
See application file for complete search history.

(56) References Cited

U.S. PATENT DOCUMENTS

| | | | |
|---|---|---|---|
| 5,176,966 A | 1/1993 | Epp et al. | |
| 5,482,792 A * | 1/1996 | Faita et al. | 429/30 |
| 5,683,828 A | 11/1997 | Spear et al. | |
| 5,798,187 A | 8/1998 | Wilson et al. | |
| 5,863,673 A | 1/1999 | Campbell et al. | |
| 5,976,726 A | 11/1999 | Wilkinson et al. | |
| 6,051,331 A | 4/2000 | Spear, Jr. et al. | |
| 6,060,190 A | 5/2000 | Campbell et al. | |
| 6,103,077 A | 8/2000 | DeMarinis et al. | |
| 6,207,310 B1 | 3/2001 | Wilson et al. | |
| 6,309,769 B1 | 10/2001 | Haug | |
| 6,555,261 B1 * | 4/2003 | Lewinski et al. | 429/34 |

* cited by examiner

*Primary Examiner*—Patrick Joseph Ryan
*Assistant Examiner*—Julian Mercado
(74) *Attorney, Agent, or Firm*—Audrey A. Millemann; Weintraub Genshles et al.

(57) ABSTRACT

The present invention is a proton exchange membrane fuel cell that includes a fuel cell assembly. The fuel cell assembly includes a bipolar separator, which includes an anode separator, a cathode separator and a membrane electrode assembly. The bipolar separator includes a highly porous, electrically conductive, non-metallic interface and a non-porous frame. The highly porous interface includes micro-channels for fluid communication and diffusion. Both the cathodic interface and anodic interface of the bipolar separator contain the highly porous material in a fluid diffusion region that interfaces with the active area of the MEA interposed between two bipolar separators. The highly porous material connects the fluid diffusion regions with their respective external sources of oxidant and fuel. The bipolar separator includes a non-porous frame that seals the highly porous material and isolates the fluids within the proton exchange membrane fuel cell.

1 Claim, 5 Drawing Sheets

Fig. 9 ic membrane fuel cells (PEMFCs) that include a bipolar separator containing highly porous, electrically conductive, non-metallic material having micro-channels.

CHANNEL-LESS PROTON EXCHANGE MEMBRANE FUEL CELL

CROSS-REFERENCE TO RELATED APPLICATION

The present application claims the benefit of U.S. provisional patent application No. 60/436,107, filed Dec. 23, 2002 and entitled "Featureless Proton Exchange Membrane Fuel Cell," which is hereby incorporated by reference.

BACKGROUND OF THE INVENTION

1. Field of the Invention

The present invention relates to electrochemical energy converters such as fuel cells or electrolysis cells. More particularly, it relates to proton exchange membrane fuel cells (PEMFCs) that include a bipolar separator containing highly porous, electrically conductive, non-metallic material having micro-channels.

2. Description of the Related Art

Existing PEMFCs include a fuel cell assembly. The fuel cell assembly has three basic components: (1) an anode separator, (2) a cathode separator, (3) and a membrane electrode assembly (MEA) interposed between the anode separator and the cathode separator. The MEA consists of an ionomeric membrane with catalyst electrodes adhered to either side; the area of the catalyst is known as the active area. Individually, the anode separator and the cathode separator are unipolar separators; unipolar separators need only the MEA interposed between them to complete the most basic PEMFC. Typically, the anode separator and the cathode separator are placed back to back to form a bipolar separator so that the anode separator and the cathode separator may each interface with MEAs. A fuel cell stack is made by alternating bipolar separators and MEAs, with unipolar separators as terminals of the stack.

PEMFCs typically employ three fluids for proper functioning: a fuel (hydrogen or reformed hydrogen gas), an oxidant (oxygen, enriched air or air), and a coolant (air, water, or specialized coolants). The fuel is transported to one side of the MEA in order to react with the catalyst of the active area. The oxidant is transported to the other side of the MEA in order to complete the electrochemical reaction. A gas diffusion layer (GDL) facilitates the diffusion of both the fuel and the oxidant across the MEA active area. The coolant is circulated through the fuel cell in a designated pattern in order to warm up the fuel cell during initialization and, most importantly, to cool the fuel cell during operation.

Existing PEMFCs suffer from six significant problems: (1) inadequate fluid distribution, (2) incomplete fluid diffusion across the active area of the membrane, (3) electrical current transmission, (4) contact resistance, (5) inconsistent mechanical loading, and (6) insufficient fluid sealing. These problems have precluded the PEMFC industry from mass-producing units of commercial utility. These problems result from the structure of existing bipolar separators.

Existing PEMFCs include bipolar separators that contain macro-channels and macro-manifolds that transport fluids to and from the active area. However, the macro-channels restrict the performance of the fuel cell because they distribute fluids to the active area only along the area that the channels traverse. In addition, the macro-channels and macro-manifolds leave gaps in the volume of the fuel cell that are unable to transmit electrical current, seal the fluids, or support mechanical loading.

Fluid Distribution

The PEMFCs of the prior art include "lands" of interstitial, non-porous material that separate the channels that distribute the fuel and oxidant to the active area of the MEA. While the channels distribute the fluids along their path, the interstitial lands between them are in contact with the active area of the fuel cell and consequently block portions of the fluids from reaching the active area of the MEA. The fuel starvation of the underlying portions of the active area causes that specific portion of the active area to be either inactive, producing no electrochemical reactions, or restricted in the amount of electrochemical activity. Each portion of inactive or restricted area subtracts from the potential totality of the active area of the fuel cell. Thus, as the quantity of inactive and restrictive areas increase, the possible maximum power output of the fuel cell decreases.

Most of the PEMFCs of the prior art include two main features that inhibit overall performance: macro-manifolds and macro-channels. The macro-manifolds distribute the three fluids transversely from their respective ports through the fuel cell to the inlet ports that lead to the macro-channels, which distribute the fluids planarly through the bipolar separators. This is a necessary process, but the macro-manifolds and macro-channels hamper fuel cell performance. The macro-channels distribute the fluids only to areas that directly interface with the channel, i.e., directly above or below the channel. Therefore, areas not in direct contact with the macro channel may not receive sufficient fluid flow, such as those areas underneath the interstitial lands between the channels. Prior art fuel cells have incorporated porous materials, known as GDLs, between the MEA and the macro-channels of the bipolar separators in order to minimize the negative effects of the macro-channels and interstitial lands. The GDLs are typically thin layers of highly porous carbon material that act like spacers, allowing the fuel and oxidant to flow somewhat more uniformly over the MEA. However, even with the use of GDLs, fluid distribution and diffusion is still not optimal, leaving inactive and restrictive portions of the MEA active area.

Fluid Diffusion

Optimal fluid diffusion is critical because it allows the active area to be permeated with the fuel and oxidant necessary to the electrochemical reactions. Fluid distribution is paramount on both the macro level and the micro level. Good fluid diffusion allows the active area to be continuously, uniformly, and simultaneously replenished with fluids. Maximizing the electrochemical reaction depends upon continuous fluid flow across the active area because breaks in the fluid stream would prevent the reactions from taking place. It also depends upon uniformity of fluid diffusion of both fluids across the active area; otherwise, there will be some portions left inactive. Maximizing the electrochemical reactions also depends upon simultaneous diffusion of the fuel and oxidant because the reactions require both the fuel and the oxidant to be present in order to occur. Superlative fluid diffusion will manifest continuous circulation of the fluids over the active area; the entirety of the active area will be uniformly permeated; and, the fluid diffusion will be simultaneous on both sides of the MEA, so that there is no lag in the electrochemical reactions.

In prior art PEMFCs, the fluids are distributed to the active area by means of the macro-channels of the bipolar separators. This not only limits fluid distribution to the active area, it also limits the fluid diffusion over the surface area of the active area. The macro-channels bias the diffusion of the fluids to predominately the active area under the macro-channels, leaving the active area under the interstitial lands depleted and significantly inactive.

Electrical Current Transmission

The electrochemical reaction that occurs in the PEMFC involves releasing electrons from hydrogen atoms as the hydrogen comes in contract with the catalyst. The electrons must pass through the bipolar separator while the hydrogen ions pass through the membrane. Once the hydrogen ions, electrons, and oxygen are all present on the other side of the membrane, they bond in the formation of water molecules. The electrons are released at the active area of the MEA, as the platinum ionizes the hydrogen atoms. The length of the path the electrons traverse, in order to rejoin hydrogen and oxygen, partially determines electrical resistance, and electrical resistance partially determines the voltage of the fuel cell, which in turn partially determines the watts or total power of the fuel cell. The shortest possible path of electrical transmission will incur the least amount of resistance and voltage drop and will therefore maintain the highest possible wattage.

Electrical current transmission is a problem in the PEMFCs that utilize macro-channels because the macro-channels act as gaps through which electrons cannot pass. The electrons must take an indirect route around the macro-channels in order to arrive at the point at which the water molecule is formed. Therefore, the more tortuous the route for the electrons, the poorer the performance of the PEMFC.

Contact Resistance

It is an important for PEMFCs to optimize voltage and avoid losing wattage due to resistance. Contact resistance is inversely proportional to contact surface area between conducting media. Because the electrical current generated in a fuel cell is transmitted from the active area of the MEA and passes through the bipolar separator, the lower the contact resistance, the higher the voltage.

In PEMFC prior art, the point of significant contact resistance occurs between the GDL and the metal or graphite bipolar separators. Because the rigid metal or graphite bipolar separators and the GDLs do not make contact at every point on the plane at which they interface, some contact resistance is inevitable. However, the more surface area that is in contact, the lower the resistance.

Mechanical Loading

In prior art fuel cells having macro-channels, the structure of the fuel cells are such that the channel areas of the fuel cell are left unloaded. The macro-channels will produce uneven mechanical loading directly underneath because the gap in the material that is the channel is unable to transmit a mechanical load. This phenomenon is typically present in all fluid layers, whether fuel, oxidant or coolant. Having loaded and unloaded areas within the bipolar separator translates into uneven loading over the whole fuel cell stack. Uneven loading can lead to fatal problems: some portions may bear more pressure than they were designed to handle, while other portions, left unloaded, may allow fluid leakage, while still others may lack electrical contact. Therefore, it is imperative that all of the components evenly bear the loading pressure. If one component does not compress correctly or is designed improperly in terms of the mechanical loading, then the entire fuel cell may not bear the loading pressure properly.

Fluid Sealing

The two predominate types of fluid leaks in PEMFCs are: (1) internal leaks from one fluid communication system to another, for example, from the hydrogen to the coolant or the coolant to the oxygen; and (2) external fluid leaks or over-board leaks from internal communication systems to the external environment. The leaks usually result from the rigid bipolar separators not mating flush with the other PEMFC parts. Existing PEMFC bipolar separators are rigid because they are manufactured from metal or carbon-based materials that are machined or sintered into the ultimate form used in the PEMFCs. Almost universally, these bipolar separators are manufactured with macro-channels on the two major planar faces of the bipolar separators. These macro-channels are connected to macro-manifolds that distribute the fuel and oxidant from external sources to the macro-channels. In turn, the macro-channels distribute and diffuse the fuel and oxidant across the anode and cathode of the MEA, respectively, in order to generate the electrochemical production of electrical power. Each macro-channel and macro-manifold is, however, a point of potential leakage between the rigid bipolar separator and the other PEMFC parts.

SUMMARY OF THE INVENTION

The present invention is a PEMFC that includes a fuel cell assembly having an anode separator, a cathode separator, and an MEA interposed between the anode separator and the cathode separator. The MEA includes of an ionomeric membrane with catalyst electrodes adhered to either side, such that the area of the catalyst is the active area. The anode separator and the cathode separator are each a unipolar separator; they may be used with an MEA interposed between them to form a basic PEMFC. Preferably, the anode separator and the cathode separator are placed back to back to form a bipolar separator so that the anode separator and the cathode separator may each interface with MEAs. A fuel cell stack is made by alternating bipolar separators and MEAs, with unipolar separators as terminals of the stack.

The anode and cathode separators of the present invention each include a GDL and a flow field gasket. The GDLs are highly porous, electrically conductive, non-metallic material. The highly porous material of the GDLs has micro-channels for fluid distribution and diffusion. The micro-channels interface with the active area of the MEA interposed between either two bipolar separators or two unipolar separators. Likewise, the micro-channels connect the fluid diffusion regions with their respective external sources of oxidant and fuel. The flow field gaskets are a non-porous material that frames the perimeter of the cathodic interface and anodic interface, respectively, in order to seal against the highly porous material and isolate the fluids within the PEMFC.

The bipolar separator of the present invention may optionally include a coolant separator which is interposed internally between the anode separator and the cathode separator. The coolant separator of the present invention includes a GDL and a flow field gasket. The GDL is highly porous, electrically conductive, non-metallic material. The highly porous material of the GDL includes micro-channels for coolant flow. The flow field gasket is non-porous material that frames the coolant GDL.

The PEMFC of the present invention does not contain any macro-cavities, such as macro-channels or macro-manifolds, in contact with the active area. The GDLs of the present invention serve the same purpose as the macro-channels and some of the macro-manifolds of the prior art PEMFCs; however, rather than using large channels and manifolds, the bipolar separator of the present invention uses micro-channels. The micro-channels are in intimate contact with the active area, such that fluids are provided to the entirety of the active area uniformly, continuously, and simultaneously. The fluid flow is not only distributed to the active area through the micro-channels, it is also distributed across the active area by way of the micro-channels.

Thus, the GDLs of the present invention replace some of the macro-manifolds that distribute the fuel and oxidant from their external sources to the macro-channels that distribute and diffuse the fluids across the active area of the membrane in the MEA. The GDLs of the present invention also replace the macro-channels. By replacing the macro-manifolds and macro-channels with GDLs, the detrimental effects of the macro voids in the prior art bipolar separator are minimized. As a result, the bipolar separator of the present invention solves the problems of the prior art PEMFCs regarding (1) fluid distribution, (2) fluid diffusion across the active area of the membrane, (3) electrical current transmission, (4) contact resistance, (5) mechanical loading, and (6) fluid sealing.

In the present invention, the three operating fluids are separated into three stratified layers so that they are distributed through the GDLs in isolation. The bipolar separator of the present invention has three fluid layers, including the highly porous, electrically conductive, non-metallic micro-channel material, with the coolant running through the middle layer and the fuel and oxidant on either distal side of the separator that interfaces with the MEAs. These three fluid layers are sealed and separated from each other by a denser, non-porous material that is also non-metallic and electrically conductive. By maintaining superior fluid sealing, the three fluids can be very close in proximity without commingling and interfering with each other.

The bipolar separator of the present invention also includes a PTFE frame gasket positioned on the outer faces of both the anode and cathode separators. The PTFE frame gasket is compliant and non-porous. PTFE frame gaskets are situated in between the MEA and the anode separators, and between another MEA and the cathode separator. The PTFE frame circumscribes the active area, preventing fluid leaks; it also circumscribes the manifolds of all three fluids.

Fluid Distribution

The present invention utilizes GDLs of highly porous, electrically conductive, non-metallic material having micro-channels, in order to attain superior fluid distribution throughout the PEMFC. The present invention eliminates the problem of dead or restricted active area by utilizing GDLs in intimate contact with the entirety of the active area of the MEA. The micro-channels of the GDLs transport the fluids from their respective ports to virtually every electrochemical site of the active area—thus, practically no portion of the active area is blocked from receiving fluid flow. With all of the active area open to the flow of fluid, the micro-channels enable all of the active area to be active, and thus take full advantage of the potential maximum power output of the fuel cell.

In place of the GDLs, macro-manifolds, and macro-channels of the prior art, the present invention contains continuous portions of GDLs having micro-channels which accomplish all of the functions and conditions of the macro-channels and macro-manifolds. Therefore, in the present invention, there are no bands of insufficient fluid flow directly under the channels.

The micro-channels produce similar fluid distribution rates as the macro-channels of prior art PEMFC, without the concomitant limitations (such as poor electrical current transmission, fluid sealing, and mechanical loading). The micro-channels exhibit continuous, uniform fluid flow throughout the entire volume of the GDLs and across the entirety of the active area. The improved fluid distribution thus promotes a greater rate of electrochemical reactions by constantly replenishing the fuel and transporting away the product (water) that would otherwise suppress the reactions. Moreover, because of its high porosity, the GDLs do not incur severe pressure gradients as the operating fluids flow through them.

Fluid Diffusion

In addition, the micro-channels of the GDLs of the present invention exhibit other advantages. They have superior fluid diffusion; not only transporting the fluid to the active area but also continuously and uniformly diffusing the fluids across the active area. Because the micro-channels of the GDLs are in intimate contact with the active area, they also enable superior current transmission, low contact resistance, and excellent mechanical loading.

In the present invention, the fluids are not restricted to flow through macro-channels; instead, they uniformly diffuse or permeate the micro-channels which cover the entirety of the active area. The fluids diffuse through the micro-channels leading to virtually every electrochemical site of the active area. This causes the fluids to uniformly, continuously and simultaneously interact with the active area. The GDLs are uniformly porous in all directions so that the fluids permeate them uniformly and are ubiquitously circulated to the active area. The uniform porosity of the GDLs also prevents severe pressure gradients as the fluid diffuses through them, thus mitigating partial or incomplete diffusion, which would diminish the power output. The present invention exhibits continuous fluid diffusion to the fuel cell active area because the micro-channels enable the fluids to be constantly circulated throughout the GDLs. The continuous circulation of fluids allows the electrochemical reactions to occur at an optimum rate, and it prevents the fluids from becoming static. Because the micro-channels are fully permeated with fluid and are in intimate contact with the entire active area, there are no dead spots of inactivity and all of the active area is active electrochemically. The GDLs function as a homogenous block of wicking material constantly being replenished and constantly permeating the active area with fluid, while also wicking away the product (water). The egression of the product (water) is paramount because otherwise the water would build up at the electrochemical sites on the active area and suppress the reactions.

Current Transmission

The present invention incorporating GDLs having micro-channels demonstrates the advantage of superior electrical current transmission. The GDLs of the present invention maintain intimate contact with substantially more of the active area than in the PEMFCs that use macro-channels.

The GDLs do contain gaps on the micro level, but the average contact area for the micro-channels always significantly more than in PEMFCs having macro-channels.

Contact Resistance

In the present invention, soft, conformable forms of graphite are used to seal the GDLs around the perimeter and the between the fluid layers. These same soft, conformable forms of graphite conform to the small pores of the GDLs, thus increasing the amount of contact surface area. Rather than interfacing in virtually two-dimensions only, the porous media and the soft, conformable forms of graphite interface three-dimensionally, providing more contact surface area. The increase in surface area enables lower contact resistance and allows higher electrical current transmission through the present invention.

Moreover, the amount of contact area between the MEA and the GDLs is significantly superior to the amount of contact area between the MEA and the macro-channels of the prior art PEMFCs.

Mechanical Loading

Another advantageous improvement over prior art PEMFCs exhibited by the present invention is its superior mechanical loading. Concluding the construction of PEMFC stack, the stack is mechanically loaded by one of several means. The mechanical loading of the fuel cell exerts pressure on all the components of the fuel cell, pressing them together in intimate contact with each other. The mechanically loaded state allows for the fluids to be contained within the fuel cell at high pressure without leaking to the external environment or leaking internally between fluid layers; the loaded state also facilitates the transmission of electrical current through the fuel cell. The present invention exhibits improved mechanical loading because the GDLs exhibit sufficient dimensional stability to support the internal pressure exerted under load.

The present fuel cell invention is similar to a monolithic block with internal features of very small size and thus very small unsupported span capable of compromising the structural integrity of the fuel cell. As an example of a preferred embodiment, the optimum GDL material situated over the active area of the fuel cell is only slightly less dense than carbon bipolar separators surrounding it, and is capable of bearing the same amount of mechanical loading pressure as the material around it; therefore the appropriate loading pressure is evenly distributed within the fuel cell without any fluid leaks. There are no unloaded channels or other internal features to cause an imbalance in the mechanical loading of the fuel cell. In this scenario, the fuel cell can be mechanically loaded with no adverse affects on the components.

Fluid Sealing

The present fuel cell invention incorporating the GDLs having micro-channels material demonstrates superior fluid sealing, another advantageous improvement over the prior art PEMFCs. Fluid sealing is related to the mechanical loading improvement stated above. The present invention demonstrates superior internal and external leak prevention due to the innovative manner in which the GDLs integrate into the PEMFC. The GDL can be situated in the flow fields designated to it in the bipolar separator so that it sits flush with the major face of the bipolar separator. If GDLs are flush with the bipolar separator, then when the bipolar separator, containing the GDL, is conjoined with the MEA, there will be virtually no surface discrepancies, blemishes, or macro-cavities such as channels, that could permit for uneven mechanical loading once the entire fuel cell is pressurized. The bipolar separator containing the GDLs acts as one major planar face sealing intimately with the MEA's adjacent major planar face. Since there are no channels, gaps, or deformities, except on the micro-level of the material, there are no inroads for the fluids to leak outside the MEA-bipolar separator interface. When the integration of the GDLs is performed optimally, the GDLs act like a more porous region of the bipolar separator designed to interface with the active area, rather than a foreign piece of material. In this preferred scenario, the pressure from the mechanical loading is evenly distributed within the bipolar separator such that the GDLs bear enough pressure to intimately seal against the MEA and prevent leakage.

A general object of the invention is to provide a mass-producible PEMFC that is economically viable in the commercial market. A more specific object of the present invention is to provide an advantageous PEMFC that resolves the limitations of the PEMFC prior art, in particular, to provide a PEMFC that has (1) adequate fluid distribution, (2) uniform fluid diffusion across the active area of the membrane, (3) optimal electrical current transmission, (4) optimal contact resistance, (5) consistent mechanical loading, and (6) sufficient fluid sealing.

DETAILED DESCRIPTION OF THE PREFERRED EMBODIMENT

Figure 1:
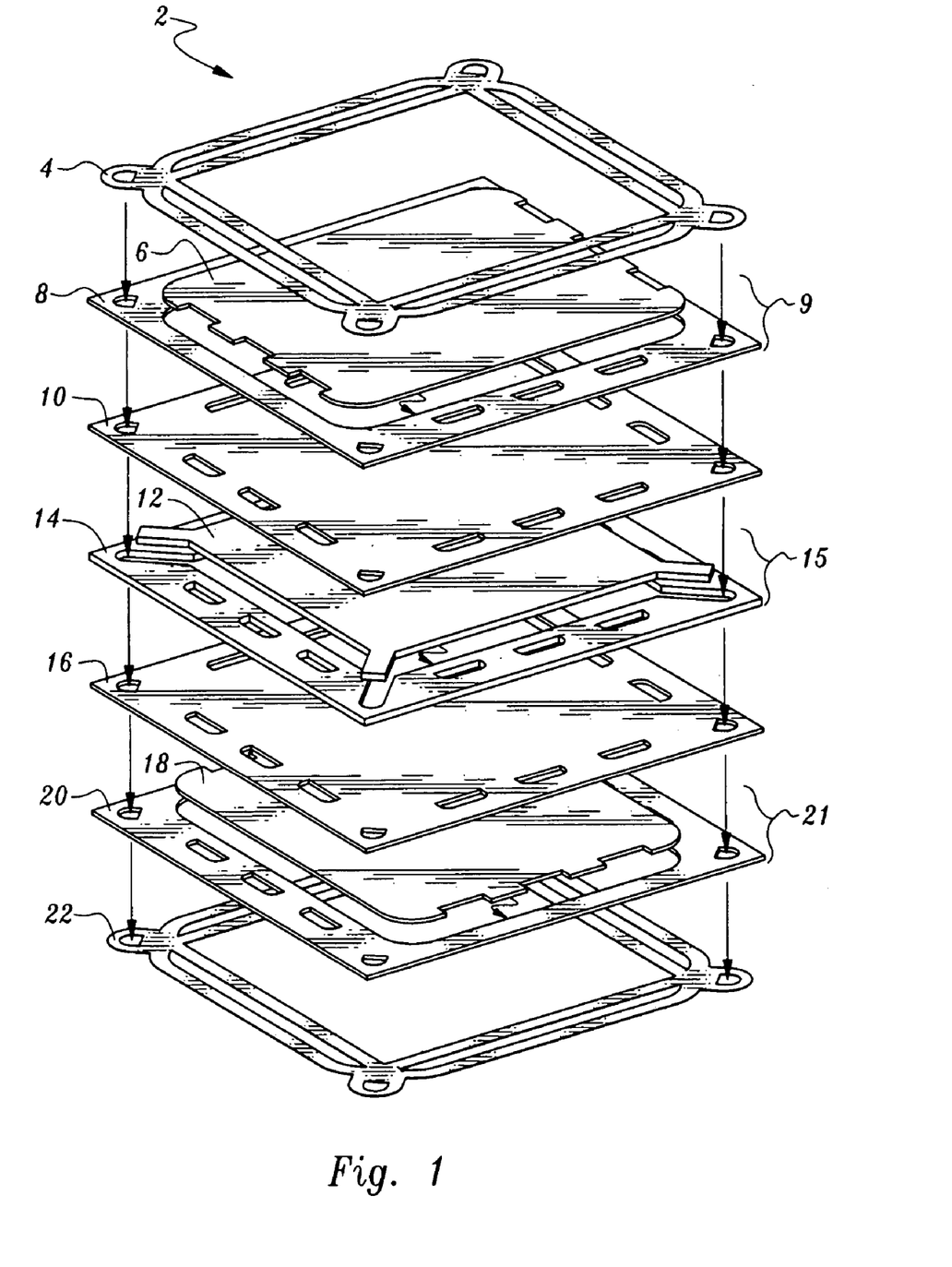
FIG. 1 is an exploded isometric view of the bipolar separator of the invention.

FIG. 1 shows an exploded isometric view of the preferred embodiment of bipolar separator 2. Bipolar separator 2 includes PTFE frame gasket 4, anode GDL 6, anode flow field gasket 8, blank gasket 10, coolant GDL 12, coolant flow field gasket 14, blank gasket 16, cathode GDL 18, cathode flow field gasket 20, and PTFE frame gasket 22. Anode GDL 6 and anode flow field gasket 8 together form anode separator 9; coolant GDL 12 and coolant flow field gasket 14 together form coolant separator 15; and cathode GDL 18 and cathode flow field gasket 20 together form cathode separator 21.

Figure 2:
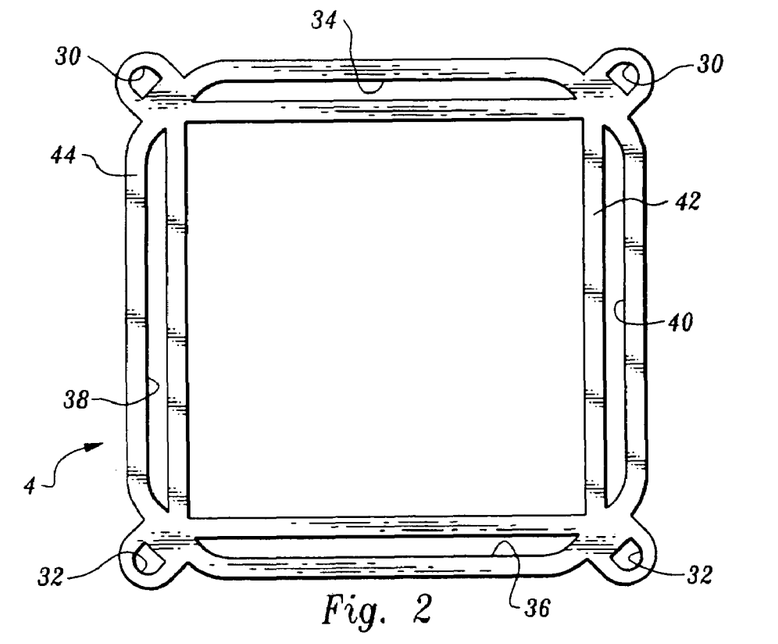
FIG. 2 is a detailed plan view of the obverse and reverse of the PTFE frame gasket.

FIG. 2 is a detailed plan view of the obverse and reverse of PTFE frame gaskets 4 and 22. PTFE frame gaskets 4 and 22 include coolant ingress manifolds 30, coolant egress manifolds 32, PTFE oxidant ingress manifold 34, PTFE oxidant egress manifold 36, PTFE fuel ingress manifold 38, PTFE fuel egress manifold 40, inner sealing perimeter 42, and outer sealing perimeter 44. PTFE frame gaskets 4 and 22 function as a conformable gasket between the MEA and the exfoliated graphite gaskets of bipolar separator 2. By way of outer sealing perimeter 44, PTFE frame gaskets 4 and 22 seal the perimeter of bipolar separator 2, arresting fluid leaking to the external environment. By way of inner sealing perimeter 42, PTFE frame gaskets 4 and 22 seal the perimeter of the active area of the MEA. PTFE frame gaskets 4 and 22 include all the manifolds necessary to distribute all three fluids throughout bipolar separator 2. Coolant flows into bipolar separator 2 via coolant ingress manifolds 30. Coolant flows through coolant GDL 12 and exits bipolar separator 2 via coolant egress manifolds 32. PTFE material circumscribes coolant manifolds 30 and 32 in order to prevent coolant leaks during ingress and egress. Coolant manifolds 30 and 32 are deliberately designed in shape and size to maximize heat transfer in bipolar separator 2. Fuel ingress manifold 38 is a vertical gap in the PTFE frame gasket that circumscribes fuel ingress manifolds 74; fuel ingress manifold 40 is a vertical gap in the PTFE frame gasket that circumscribes fuel egress manifolds 76. By way of PTFE fuel manifolds 38 and 40, PTFE frame gaskets 4 and 22 arrest fuel leaks from fuel manifolds 74 and 76. PTFE oxidant ingress manifold 34 is a horizontal gap in PTFE frame gaskets 4 and 22 that circumscribes oxidant ingress manifolds 62; PTFE oxidant egress manifold 36 is a horizontal gap in PTFE frame gaskets 4 and 22 that circumscribes oxidant egress manifolds 64. By way of PTFE oxidant manifolds 34 and 36, PTFE frame gaskets 4 and 22 arrest oxidant leaks from oxidant manifolds 62 and 64.

Figure 3:
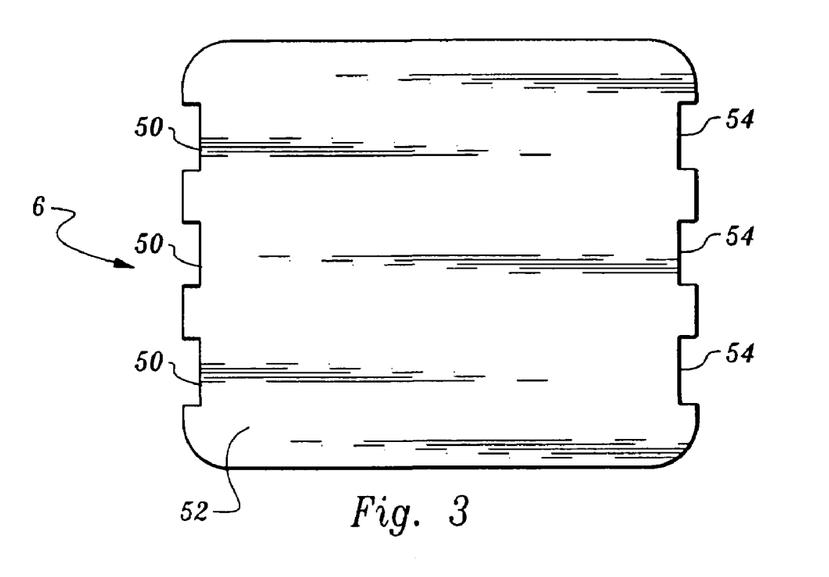
FIG. 3 is a detailed plan view of the obverse and reverse of the anode GDL.

FIG. 3 is a complete obverse and reverse view of anode GDL 6. Anode GDL 6 includes notches for fuel ingress 50, gas diffusion area 52, and notches for fuel egress 54. Anode GDL 6 is positioned in anode flow field 60 in anode flow field gasket 8 that aligns with the active area of the MEA, not shown in the figures. Notches for fuel ingress 50 conform to the outline of fuel ingress manifolds 74 so that fuel may enter anode GDL 6 and flow through gas diffusion area 52. The fuel diffuses across the entire surface area of anode GDL 6, maximizing the electrochemical reactions at the anode. The fluid pressure that drives the fuel through bipolar separator 2 forces the unused fuel to exit anode GDL 6 through notches for fuel egress 54 and into fuel egress manifolds 76. The utility of replacing the macro channels with anode GDL 6 is that anode GDL 6 distributes and diffuses more fuel across more of the anode via micro channels. The GDL is similar to carbon paper, a highly porous material that allows for a substantial increase of gas diffusion. Where macro channels seal or choke off some parts of the anode, the present invention is able to use that space to maximize electrochemical reaction and power production. The area and volume of anode GDL 6 are functions of several variables, such as the size of the MEA active area, the desired power output of the PEMFC, desired fuel stoichiometry and fluid dynamics. Therefore, when the parameters of these variables change, the shape, size, and volume of anode GDL 6 can be modified accordingly. Concomitantly, anode flow field gasket 8 will have to be modified to accommodate any of these changes. It will have to be made thinner if anode GDL 6 is made thinner; it will have to be made thicker if anode GDL 6 is made thicker; and the perimeter of anode flow field 60 will have to be modified to mate to a new shape of anode GDL 6.

Figure 4:
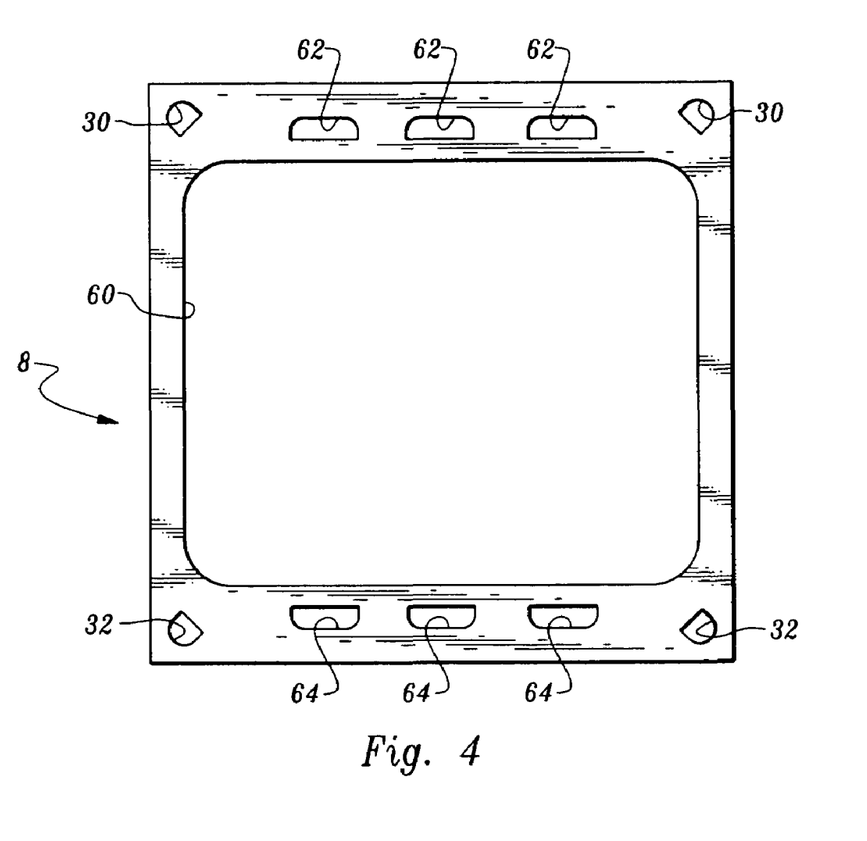
FIG. 4 is a detailed plan view of the obverse and reverse of the anode flow field gasket.

FIG. 4 is a complete obverse and reverse view of anode flow field gasket 8. Anode flow field gasket 8 includes anode flow field 60, oxidant ingress manifolds 62 (obscured in FIG. 1), and oxidant egress manifolds 64. Anode flow field gasket 8 has two main functions. First, it functions as a frame of exfoliated graphite for anode GDL 6. Anode GDL 6 is positioned in anode flow field 60. The non-porous anode flow field gasket 8 functions as a boundary, arresting fuel from diffusing beyond the perimeter of anode GDL 6. Second, anode flow field gasket 8 also functions—as do all the gaskets in bipolar separator 2— as manifolding for the distribution of the operating fluids of the PEMFC. As anode flow field gasket 8 and cathode flow field gasket 20 are identical, differentiated only by their orientation in bipolar separator 2, the position of the manifolds determines which fluid will flow through the manifolds. Manifolds 62, 64, 74, and 76 are identical manifolds. In anode flow field gasket 8, oxidant ingress manifolds 62 (obscured in FIG. 1) allow the oxidant stream to continue flowing through bipolar separator 2 without diffusing into the anodic region. Similarly, oxidant egress manifolds 64 allow the unused oxidant stream to exit bipolar separator 2 without leaking into other regions. Manifolds 62, 64, 74, and 76 are deliberately designed in shape and size in order to attain proper stoichiometry and fluid dynamics according to the objects of the present invention. Thus, if in the use of the invention, it is desired to change the functional purpose of the PEMFC, the shape, size, and placement of the manifolds can be changed without necessarily affecting the utility of the PEMFC. For example, if it was desired to run the PEMFC on pure oxygen to increase the performance, oxidant manifolds 62 and 64 could be made larger or smaller, depending upon the motive for using pure oxygen.

Figure 5:
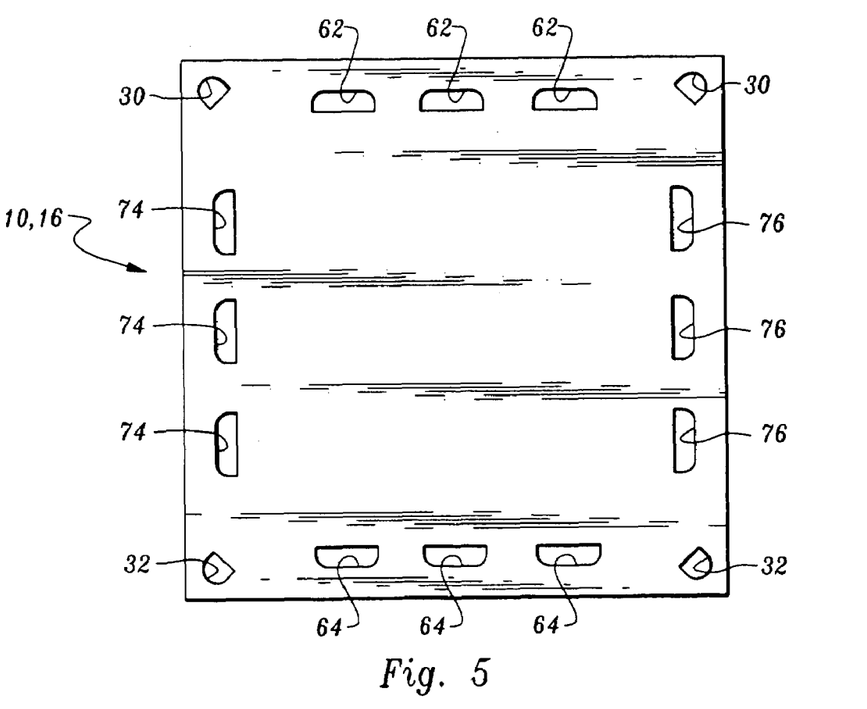
FIG. 5 is a detailed plan view of the obverse and reverse of the blank gasket.

FIG. 5 is a complete obverse and reverse view of blank gaskets 10 and 16. Blank gaskets 10 and 16 include coolant manifolds 30 and 32, oxidant manifolds 62 [obscured in FIG. 1] and 64, fuel ingress manifolds 74, and fuel egress manifolds 76. Blank gaskets 10 and 16 isolate the fluid circuits from each other. Blank gaskets 10 and 16 have every manifold feature for each of the three fluid circuits: fuel, coolant, and oxidant. Blank gasket 10 functions as isolation, physically separating the fuel flowing through anode GDL 6 from the coolant flowing through coolant GDL 12. Blank gasket 16 separates the coolant flowing through coolant GDL 12 from the oxidant flowing through cathode GDL 18. Blank gaskets 10 and 16 are so named because they do not include a flow field as do anode flow field gasket 8 and cathode flow field gasket 20.

Figure 6:
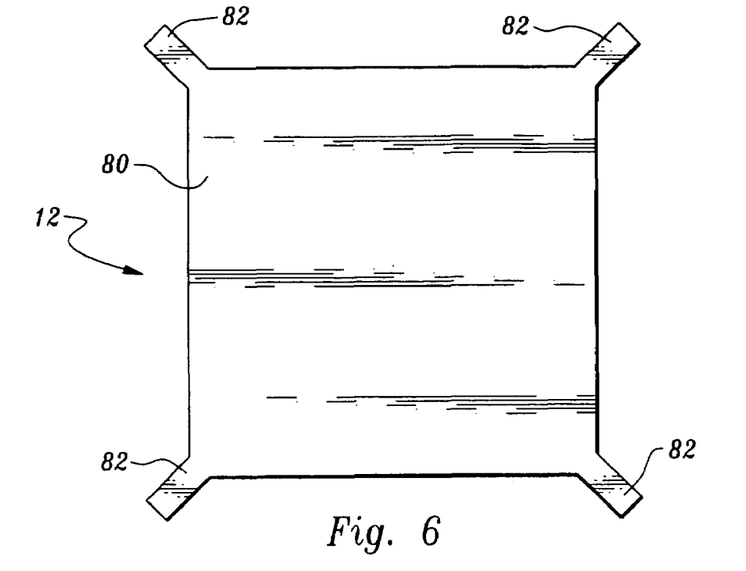
FIG. 6 is a detailed plan view of the obverse and reverse of the coolant GDL.
Figure 7:
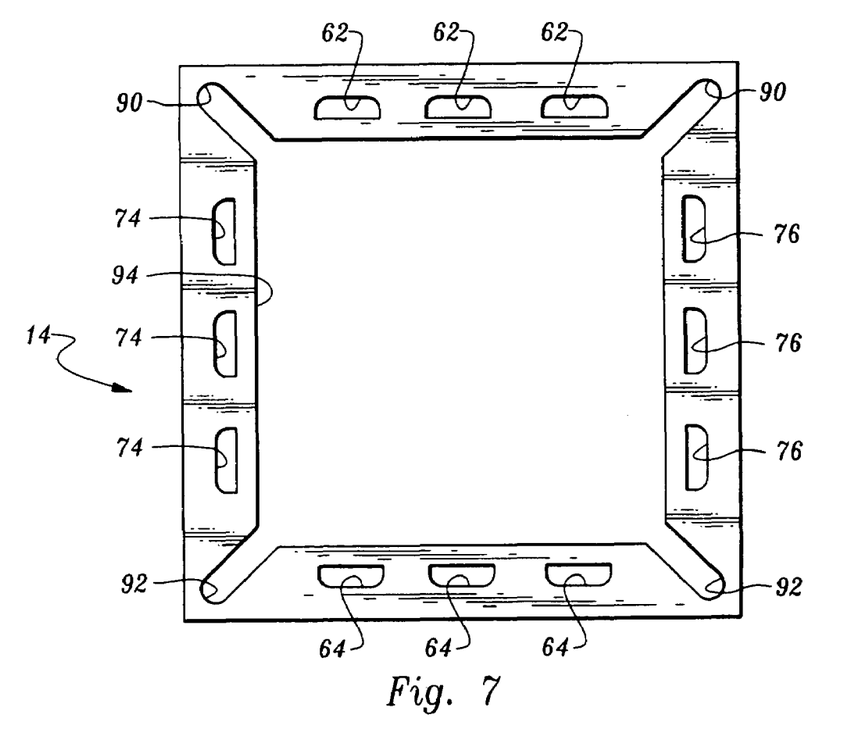
FIG. 7 is a detailed plan view of the obverse and reverse of the coolant flow field gasket.

FIG. 6 is a complete obverse and reverse view of coolant GDL 12. Coolant GDL 12 includes gas diffusion area 80 and peninsular extremities 82. As shown in FIG. 7, the coolant enters coolant GDL 12 at peninsular extremities 82 that fit into coolant ingress feeds 90. The coolant flows through coolant GDL 12 and either dumps heat into bipolar separator 2 to warm up the PEMFC or picks up heat to maintain an appropriate operating temperature. The coolant exits coolant GDL 12 as described below. The area and volume of coolant GDL 12 are functions of several variables, such as the desired heat transfer rate, the desired power output of the PEMFC, and the size of the MEA active area. Therefore, when the parameters of these variables change, the shape, size, and volume of coolant GDL 12 can be modified accordingly. Concomitantly, coolant flow field gasket 14 will have to be modified to accommodate any of these changes. It will have to be made thinner if coolant GDL 12 is made thinner; it will have to be made thicker if coolant GDL 12 is made thicker; and the perimeter of coolant flow field 94 will have to be modified to mate to a new shape of coolant GDL 12.

FIG. 7 is a complete obverse and reverse view of coolant flow field gasket 14. Coolant flow field gasket 14 includes coolant ingress feeds 90, coolant egress feeds 92, and coolant flow field 94. Similar to blank gaskets 10 and 16, coolant flow field gasket 14 includes all of the manifolds for each of the three fluids. However, as shown in FIG. 7, the coolant flowing through coolant ingress manifolds 30 is diverted into coolant ingress feeds 90. Once the coolant enters the feeds, it flows through peninsular extremities 82. The coolant transfers heat with bipolar separator 2 as it flows through coolant GDL 12. The coolant exits coolant GDL 12 via coolant egress feeds 32. From coolant egress feeds 92, the coolant exits bipolar separator 2 via coolant egress manifolds 32. Coolant flow field gasket 14 functions as a frame of exfoliated graphite for coolant GDL 12. Coolant GDL 12 is positioned in coolant flow field 94. The non-porous coolant flow field gasket 14 functions as a boundary, arresting coolant from diffusing beyond the perimeter of coolant GDL 12. Coolant manifolds 30 and 32 and coolant feeds 90 and 92 are deliberately designed in shape and size in order to attain proper heat transfer and fluid dynamics according to the objects of the present invention. Thus, if in the use of the invention, it is desired to change the functional purpose of the PEMFC, the shape, size, and placement of the manifolds can be changed without necessarily affecting the utility of the PEMFC. For example, if it was desired to run the PEMFC in extreme cold, coolant manifolds 30 and 32 and coolant feeds 90 and 92 could be enlarged in order to allow more heated fluid to flow through the PEMFC during warm up cycles.

Figure 8:
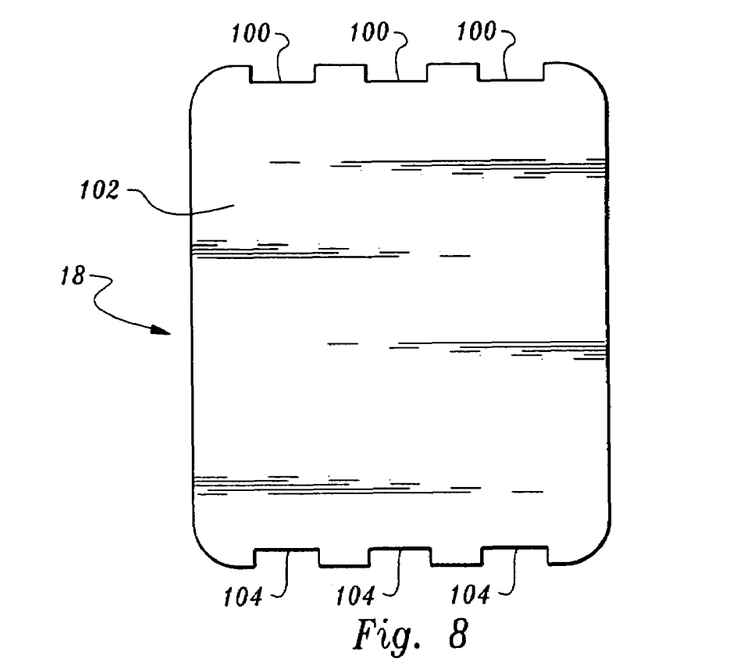
FIG. 8 is a detailed plan view of the obverse and reverse of the cathode GDL.

FIG. 8 is a complete obverse and reverse view of cathode GDL 18. Cathode GDL 18 includes notches for oxidant ingress 100 (partially obscured in FIG. 1), gas diffusion area 102, and notches for oxidant egress 104. Cathode GDL 18 is positioned in cathode flow field 110 in cathode flow field gasket 20 that aligns with the cathode side of the active area of the MEA, not shown in the figures. Notches for oxidant ingress 100 conform to the outline of oxidant ingress manifolds 62 so that oxidant may enter cathode GDL 18 and flow through gas diffusion area 102. The oxidant diffuses across the entire surface area of cathode GDL 18, maximizing the electrochemical reactions at the cathode. The fluid pressure that drives the oxidant through bipolar separator 2 forces the unused oxidant to exit cathode GDL 18 through the notches for oxidant egress 104 and into oxidant egress manifolds 64. The utility of replacing the macro-channels with cathode GDL 18 is that the GDL distributes and diffuses more oxidant across more of the cathode via micro-channels. The GDL is similar to carbon paper, a highly porous material that allows for a substantial increase of gas diffusion. Where macro-channels seal or choke off some parts of the cathode, the present invention is able to use that space to maximize electrochemical reaction and power production. The area and volume of cathode GDL 18 are functions of several variables, such as the size of the MEA active area, the desired power output of the PEMFC, desired oxidant stoichiometry and fluid dynamics. Therefore, when the parameters of these variables change, the shape, size, and volume of cathode GDL 18 can be modified accordingly. Concomitantly, cathode flow field gasket 20 will have to be modified to accommodate any of these changes. It will have to be made thinner if cathode GDL 18 is made thinner; it will have to be made thicker if cathode GDL 18 is made thicker; and the perimeter of cathode flow field 110 will have to be modified to mate to a new shape of cathode GDL 18.

Figure 9:
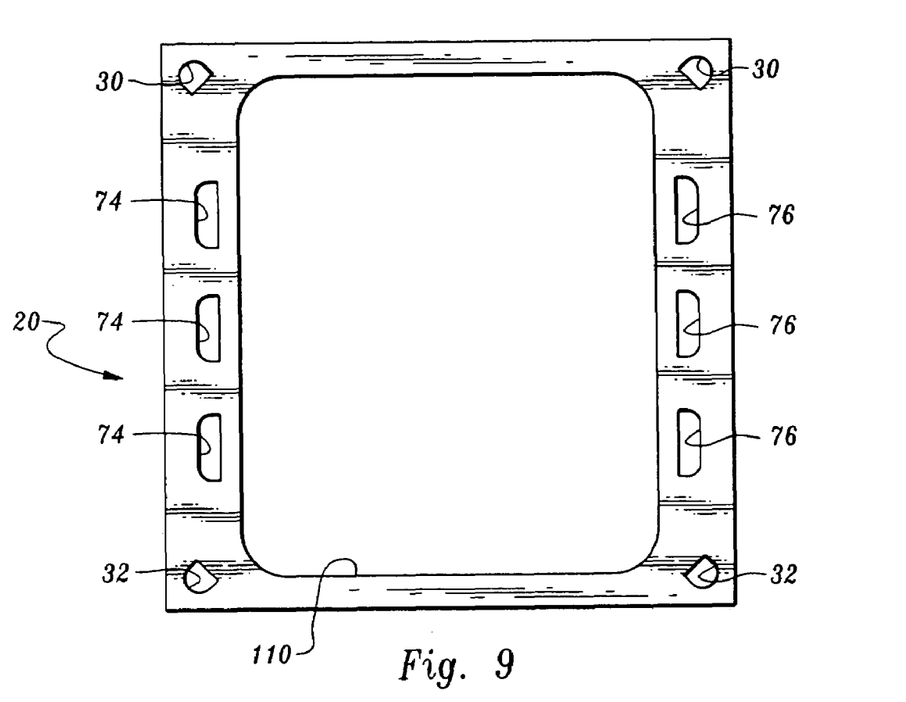
FIG. 9 is a detailed plan view of the obverse and reverse of the cathode flow field gasket.

FIG. 9 is a complete obverse and reverse view of cathode flow field gasket 20. Cathode flow field gasket 20 includes cathode flow field 110, fuel ingress manifolds 74, and fuel egress manifolds 76 (partially obscured in FIG. 1). Like anode flow field gasket 8, cathode flow field gasket 20 functions both as a frame for sealing the oxidant and as manifolding for the distribution of fluids throughout bipolar separator 2 and the PEMFC. First, cathode GDL 18 is positioned in cathode flow field 110. The non-porous cathode flow field gasket 20 functions as a boundary, arresting oxidant from diffusing beyond the perimeter of cathode GDL 18. Second, cathode flow field gasket 20 also functions—as do all the gaskets in bipolar separator 2—as manifolding for the distribution of the operating fluids of the PEMFC. As anode flow field gasket 8 and cathode flow field gasket 20 are identical, differentiated only by their orientation in bipolar separator 2, the position of the manifolds determines which fluid will flow through the manifolds. Manifolds 62, 64, 74, and 76 are identical manifolds. In cathode flow field gasket 20, fuel ingress manifolds 74 allow the fuel stream to continue flowing through bipolar separator 2 without diffusing into the cathodic region. Similarly, fuel egress manifolds 76 allow the unused fuel stream to exit bipolar separator 2 without leaking into other regions. Manifolds 62, 64, 74, and 76 are deliberately designed in shape and size in order to attain proper stoichiometry and fluid dynamics according to the objects of the present invention. Thus, if in the use of the invention, it is desired to change the functional purpose of the PEMFC, the shape, size, and placement of the manifolds can be changed without necessarily affecting the utility of the PEMFC.

PTFE frame gaskets 4 and 22 are preferably made of PTFE, commercially known as Teflon.

Anode flow field gasket 8, blank gaskets 10 and 16, coolant flow field gasket 14, and cathode flow field gasket 20 are preferably made of a soft form of graphite, such as foils or exfoliated graphite. Exfoliated graphite is optimum because it is in excellent fluid sealing material. As such, the gaskets conform to surrounding parts and to each other so that they seal the operating fluid circuits from one another. As they conform under the sealing pressure, isolating the fluids, the gaskets also function to distribute the load of the sealing pressure evenly across bipolar separator 2 and the PEMFC. Exfoliated graphite can be purchased from Graftech and SGL, among others.

Preferably, the GDL material for anode GDL 6, coolant GDL 12, and cathode GDL 18 are similar or identical in composition. The GDLs may be coated with a hydrophobic sealant, such as liquid PTFE, in order to wick the product water out of the GDL and into the egress manifolds. The underlying GDL structure is preferably a carbon paper product that can be purchased from several manufacturers, one of which is Toray.

The invention has been described above with reference to the preferred embodiments. Those skilled in the art may envision other embodiments and variations of the invention that fall within the scope of the claims.

We claim:

1. An electrochemical fuel cell stack, comprising at least one fuel cell assembly, wherein said fuel cell assembly comprises:
   a. an anode separator, comprising electrically conductive, non-metallic material, wherein said material is a carbon paper product that is highly porous and includes micro-channels, and further, wherein said anode separator comprises at least one fuel ingress and at least one means for fuel distribution from said fuel ingress to an anode flow field;

b. a cathode separator, comprising electrically conductive, non-metallic material, wherein said material is a carbon paper product that is highly porous and includes micro-channels, and further, wherein said cathode separator comprises at least one oxidant ingress and at least one means for oxidant distribution from said oxidant ingress to a cathode flow field;

c. a membrane electrode assembly interposed between said anode separator and said cathode separator, wherein said membrane electrode assembly comprises a proton exchange membrane interposed between an anode and a cathode; and d. a coolant separator interposed between said anode separator and said cathode separator, wherein said coolant separator comprises:
 (i) electrically conductive, non-metallic material, wherein said material is a carbon paper product that is highly porous and includes micro-channels;
 (ii) at least one coolant ingress;
 (iii) at least one means for coolant distribution from said coolant ingress to a coolant flow field;
 (iv) at least one coolant egress; and
 (v) at least one means for coolant distribution from said coolant flow field to said coolant egress.

\* \* \* \* \*